US011936084B2

(12) United States Patent
Jin et al.

(10) Patent No.: US 11,936,084 B2
(45) Date of Patent: Mar. 19, 2024

(54) FILTER STRUCTURE AND MANUFACTURING METHOD THEREOF

(71) Applicants: Beijing BOE Sensor Technology Co., Ltd., Beijing (CN); BOE TECHNOLOGY GROUP CO., LTD., Beijing (CN)

(72) Inventors: Yunnan Jin, Beijing (CN); Zhifeng Zhang, Beijing (CN)

(73) Assignees: Beijing BOE Sensor Technology Co., Ltd., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 110 days.

(21) Appl. No.: 17/548,554

(22) Filed: Dec. 12, 2021

(65) Prior Publication Data

US 2022/0302567 A1 Sep. 22, 2022

(30) Foreign Application Priority Data

Mar. 22, 2021 (CN) ........................ 202120576782.9

(51) Int. Cl.
*H01P 1/20* (2006.01)
*H01P 11/00* (2006.01)

(52) U.S. Cl.
CPC .............. *H01P 1/20* (2013.01); *H01P 11/007* (2013.01)

(58) Field of Classification Search
CPC ................................ H01P 1/20; H01P 11/007
See application file for complete search history.

(56) References Cited

U.S. PATENT DOCUMENTS

2010/0081768 A1* 4/2010 Kizu ...................... C08L 65/00 525/211

FOREIGN PATENT DOCUMENTS

| | | | | |
|---|---|---|---|---|
| CN | 106887710 A | 6/2017 | | |
| CN | 108054517 A | 5/2018 | | |
| CN | 111430929 A | 7/2020 | | |
| CN | 111769343 A | * 10/2020 | ................ | H01P 1/20 |
| CN | 111769344 A | * 10/2020 | ................ | H01P 1/20 |

* cited by examiner

*Primary Examiner* — Andrea Lindgren Baltzell
*Assistant Examiner* — Kimberly E Glenn
(74) *Attorney, Agent, or Firm* — HOUTTEMAN LAW LLC

(57) ABSTRACT

The present disclosure provides a filter structure and a method for manufacturing a filter structure. The filter structure includes a metal resonant array. The metal resonant array includes a plurality of array units. The filter structure further includes a transparent plastic film. The metal resonant array is provided on the transparent plastic film.

18 Claims, 8 Drawing Sheets

FILTER STRUCTURE AND MANUFACTURING METHOD THEREOF

CROSS-REFERENCE TO RELATED APPLICATIONS

The present application claims the priority of the Chinese Patent Application No. 202120576782.9, filed on Mar. 22, 2021, the content of which is incorporated herein by reference in its entirety.

TECHNICAL FIELD

The present disclosure relates to the field of communication apparatuses, and in particular, to a filter structure and a manufacturing method thereof.

BACKGROUND

Under the trend of 5G industrial interconnection, in order to realize high-speed data transmission in factories, a 4.9 GHz band (i.e., an N79 band with a frequency ranging from 4,800 MHz to 4,900 MHz) is expected to be a favorable frequency band for an uplink (or upload) of industrial interconnection big data.

SUMMARY

A first aspect of the present disclosure provides a filter structure, which includes a metal resonant array including a plurality of array units, wherein the filter structure further includes a transparent plastic film, and the metal resonant array is on the transparent plastic film.

In an embodiment, the transparent plastic film has a thickness in a range from 50 um to 250 um.

In an embodiment, a material of the transparent plastic film includes any one of polyimide, polyethylene terephthalate, cyclic olefin polymer, and polymethyl methacrylate.

In an embodiment, each of the plurality of array units includes at least one metal patch, each of the at least one metal patch includes a metal patch body having therein a plurality of hollow holes.

In an embodiment, each of the plurality of hollow holes has a shape of a rectangle, and a distance between any adjacent two of the plurality of hollow holes is in a range from 2 um to 30 um.

In an embodiment, each of the plurality of hollow holes has a shape of a square, and a length of each side of the square is in a range from 50 um to 200 um.

In an embodiment, the metal patch body has a thickness in a range from 1 um to 10 um in a direction perpendicular to the transparent plastic film.

In an embodiment, a material of the metal patch body includes any one of copper, silver, aluminum, and magnesium.

In an embodiment, each of the plurality of array units includes at least two metal patches, the at least two metal patches are provided axisymmetrically, each of the at least two metal patches includes at least one opening, and openings of the at least two metal patches are provided symmetrically with respect to a symmetry axis of the at least two metal patches.

In an embodiment, each metal patch body includes at least one bent portion, each of the at least one bent portion includes two straight arms and one first connection arm, the two straight arms in a same bent portion extend in a same direction, ends of the two straight arms proximal to a center of the array unit including the two straight arms are connected to each other through the first connection arm, and the two straight arms and the first connection arm form the opening.

In an embodiment, each metal patch body further includes two strip portions, the two strip portions extend along a same direction which is different from an extending direction of the two straight arms, and the two strip portions are respectively connected to ends, which are distal to the center of the array unit including the two straight arms, of the two straight arms at two ends of the metal patch body along an arrangement direction in which the at least one bent portion of the metal patch body is arranged.

In an embodiment, each metal patch body includes one bent portion, and the ends of the two straight arms of the one bent portion distal to the center of the array unit including the two straight arms are connected to two corresponding strip portions, respectively.

In an embodiment, each metal patch body includes a plurality of bent portions arranged in sequence along an extending direction of the two strip portions, ends of two adjacent straight arms belonging to different bent portions distal to the center of the array unit including the two adjacent straight arms are connected to each other through a second connection arm, and ends, which are distal to the center of the array unit, of two of the straight arms of the plurality of bent portions at two sides along an arrangement direction of the plurality of bent portions of the metal patch body are connected to corresponding strip portions, respectively.

In an embodiment, in the one bent portion of the metal patch body, the extending directions of the two straight arms are the same, an extending direction of the first connection arm is the same as an extending direction of the two strip portions, and the extending direction of the two straight arms and the extending direction of the first connection arm are perpendicular to each other.

In an embodiment, each of the plurality of array units includes four metal patches, a first two metal patches of the four metal patches are provided axisymmetrically, a second two metal patches of the four metal patches are provided axisymmetrically, and a symmetry axis of the first two metal patches is perpendicular to an symmetry axis of the second two metal patches.

In an embodiment, the plurality of array units are arranged in an array on the transparent plastic film in a row direction and a column direction, an extending direction of the symmetry axis of the first two metal patches is parallel to the column direction, and an extending direction of the symmetry axis of the second two metal patches is parallel to the row direction.

In an embodiment, metal patches in any adjacent two of the plurality of array units in the row direction are provided axisymmetrically, and/or metal patches in any adjacent two of the plurality of array units in the column direction are provided axisymmetrically.

A second aspect of the present disclosure provides a method for manufacturing a filter structure, the method including: providing a transparent plastic film; and forming a metal resonant array on the transparent plastic film, wherein the metal resonant array includes a plurality of array units.

In an embodiment, the transparent plastic film is formed to have a thickness in a range from 50 um to 250 um, and the transparent plastic film is made of a material being any one of polyimide, polyethylene terephthalate, cyclic olefin polymer, and polymethyl methacrylate.

In an embodiment, the metal resonant array if formed on the transparent plastic film by an implanting process or an etching process, wherein each of the plurality of array units of the metal resonant array includes at least one metal patch, and each of the at least one metal patch includes a metal patch body having therein a plurality of hollow holes.

BRIEF DESCRIPTION OF DRAWINGS

The drawings, which are intended to provide a further understanding of the present disclosure and constitute a part of the specification, are provided to explain the present disclosure together with the following exemplary embodiments, but do not limit the present disclosure. In the drawings.

DETAIL DESCRIPTION OF EMBODIMENTS

The exemplary embodiments of the present disclosure will be described in detail below with reference to the drawings. It should be understood that, the exemplary embodiments described herein are only adopted to illustrate and explain the present disclosure, but are not to limit the present disclosure.

In a complex electromagnetic wave environment, cross-talk often occurs between electromagnetic waves in a same frequency band, which degrades the quality of communication between communication apparatuses, and therefore, it is a popular issue to develop a band stop frequency selection structure capable of effectively blocking penetration and leakage of the electromagnetic waves in the frequency band.

Frequency Selective Surface (FSS) is a two-dimensional periodic array structure, which is essentially a spatial filter and shows obvious filtering characteristics of a pass band or a band stop when interacting with electromagnetic waves. In the related art, a metal resonant array is generally formed by forming metal patches on a Printed Circuit Board (PCB). In the metal resonant array, resonance phenomenon may occur in the metal resonant structure formed by each of the metal patches when the metal resonant structure receives electromagnetic waves in a specific frequency range, so that a transmission coefficient of an electromagnetic wave signal in the frequency range on the metal resonant array approaches to zero, and further the signal in the frequency range is shielded.

However, the related frequency selective surface structure for shielding 4.9 GHz band is generally thick and unsightly, affecting the overall volume, weight and aesthetics of an apparatus. Therefore, to provide a frequency selective surface structure with a better appearance and a smaller thickness is an urgent technical problem to be solved in the field.

Figure 1:
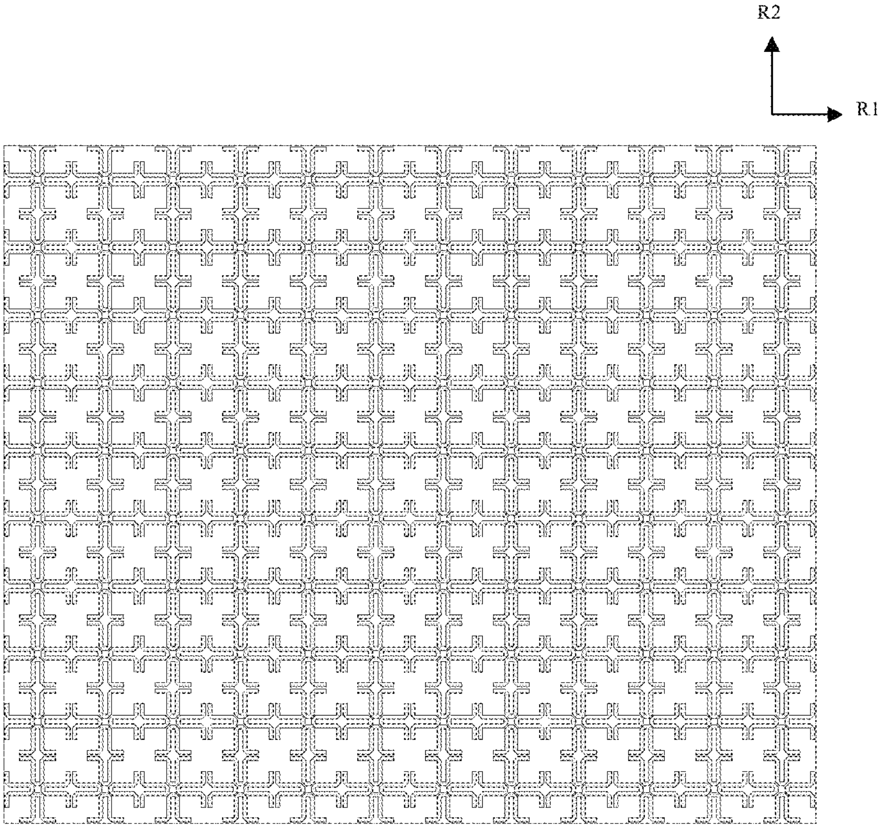
FIG. 1 is a schematic diagram illustrating a filter structure according to an embodiment of the present disclosure.
Figure 2:
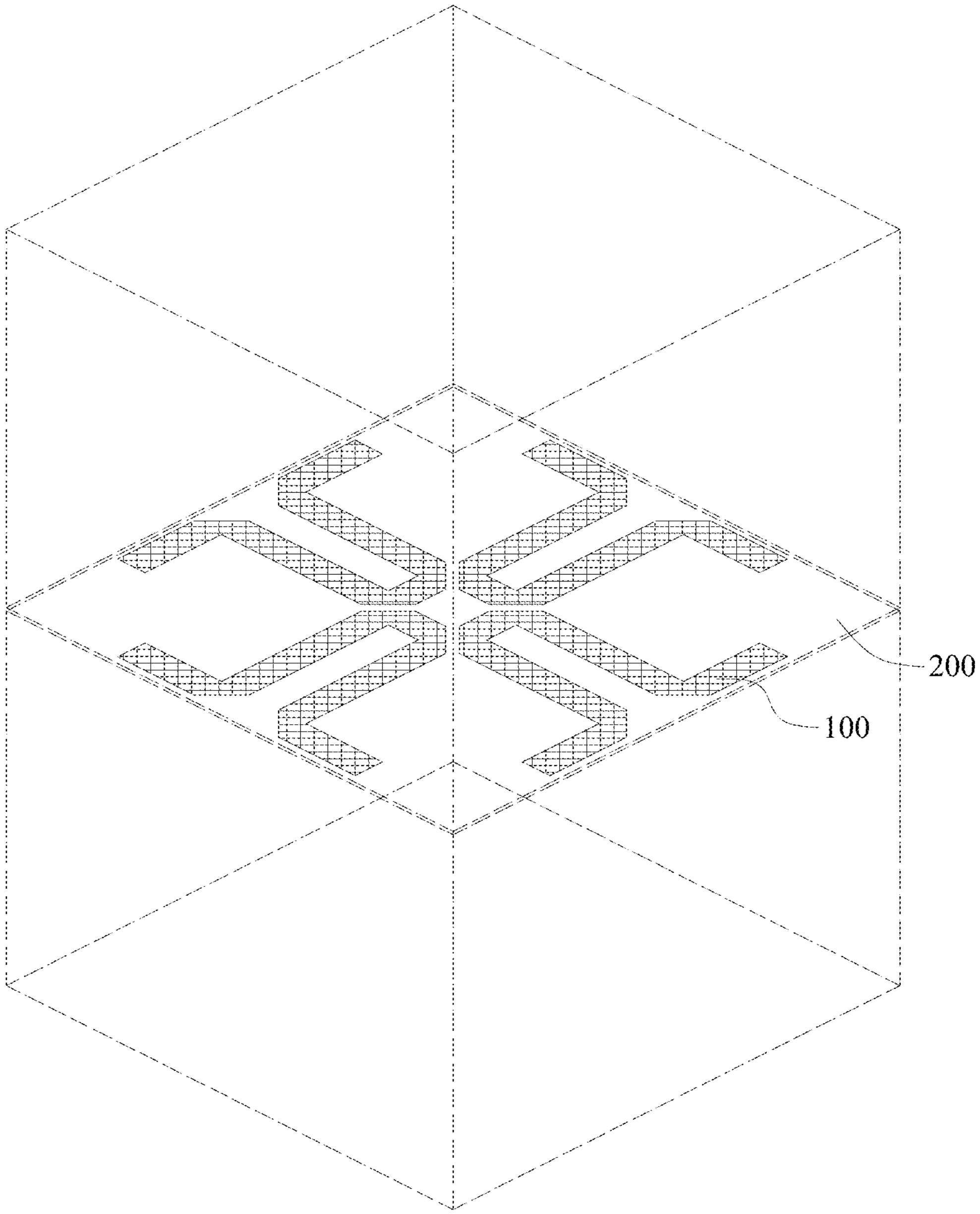
FIG. 2 is a schematic diagram illustrating a structure of an array unit in a filter structure according to an embodiment of the present disclosure.

At least to solve the above technical problem, as shown in FIGS. 1 and 2, the present disclosure provides a filter structure (i.e., a frequency selective surface structure) including a metal resonant array. The metal resonant array includes a plurality of array units, and the plurality of array units may have a same structure. FIG. 2 is a schematic diagram illustrating a structure of one of the array units of the metal resonant array shown in FIG. 1. The filter structure further includes a transparent plastic film 200, and the metal resonant array is provided on the transparent plastic film 200.

A method for providing the plurality of array units in an array on the transparent plastic film 200 is not specifically in an embodiment of the present disclosure. For example, as shown in FIG. 1, the plurality of array units are arranged on the transparent plastic film 200 along a row direction R1 and a column direction R2, and the row direction R1 and the column direction R2 may be perpendicular to each other. It should be noted that, the filter structure provided by the present disclosure may be an infinite periodic arrangement structure, that is, the number of array units arranged in an array is not specifically limited. FIG. 1 merely shows some of the array units in the filter structure, for example, 10×10 (i.e., 100) array units, to illustrate the arrangement rule of all the array units of the filter structure.

In the present disclosure, the metal resonant array is provided on the transparent plastic film 200. The filter structure adopting the transparent plastic film 200 has a high light transmittance. Moreover, due to the flexibility characteristic of the transparent plastic film, the filter structure is easy to be attached to a surface of an object such as transparent glass, transparent plastic and the like, and itself is hidden from view, thereby enhancing the overall aesthetics of an apparatus. Compared with a frequency selective surface structure manufactured by taking a PCB as a substrate in the related art, the filter structure provided by the present disclosure has more excellent aesthetics and concealment, and unlike a frequency selective surface structure, which takes a PCB as a substrate, needing to be provided inside a corresponding apparatus for concealing the PCB substrate, the filter structure provided by the present disclosure is not required to be provided inside a corresponding apparatus for concealing, thereby being beneficial to realizing lightness and thinness of the apparatus.

The internal structure of each of the array units is not specifically limited in an embodiment of the present disclosure. For example, the filter structure provided by the present disclosure may be adopted to filter out electromagnetic signals in the 4.9 GHz band, and each of the array units may be formed by forming one or more corresponding metal patches on the transparent plastic film 200. For example, as an optional embodiment of the present disclosure, as shown in FIG. 2, each of the array units includes at least one metal patch 100.

A thickness of the transparent plastic film 200 is not specifically limited in an embodiment of the present disclosure, and may be preset based on a required light transmittance. For example, as an optional embodiment of the present disclosure, the thickness of the transparent plastic film 200 may be in a range from 50 um to 250 um. For example, the thickness of the transparent plastic film 200 may be 50 um, 60 um, 70 um, 80 um, 90 um, 100 um, 110 um, 120 um, 130 um, 140 um, 150 um, 160 um, 170 um, 180 um, 190 um, 200 um, 210 um, 220 um, 230 um, 240 um or 250 um. The metal patch 100 is provided on the transparent plastic film, the overall structure of the metal patch 100 and the transparent plastic film is easy to be attached to a flat surface of another object, and has better aesthetics and concealment.

A material of the transparent plastic film 200 is not specifically limited in an embodiment of the present disclosure. The material of the transparent plastic film 200 may include polyimide, polyethylene terephthalate, cyclic olefin polymer, or polymethyl methacrylate.

A method for forming the metal patch 100 is not specifically limited in an embodiment of the present disclosure. For example, as an optional embodiment of the present disclosure, a laser direct structuring (LDS) technology may be adopted to form a plurality of metal patches 100 on the transparent plastic film 200 by laser engraving and electroless plating (i.e., laser engraving and chemical plating).

Figure 3A:
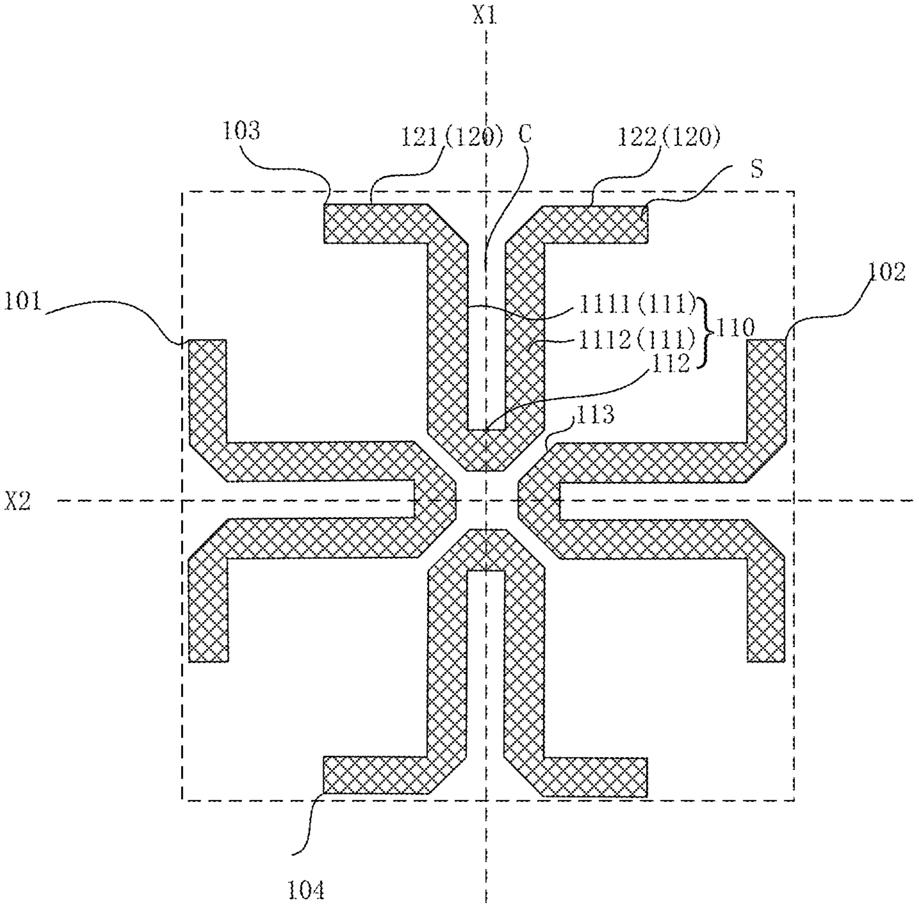
FIG. 3A is a plan view of an array unit according to an embodiment of the present disclosure.

In order to further enhance the light transmittance of the filter structure and the overall aesthetics of an apparatus including the filter structure, as shown in FIGS. 2 and 3A, optionally, each of the metal patches 100 includes a metal patch body and a plurality of hollow holes S formed in the metal patch body.

Figure 3B:
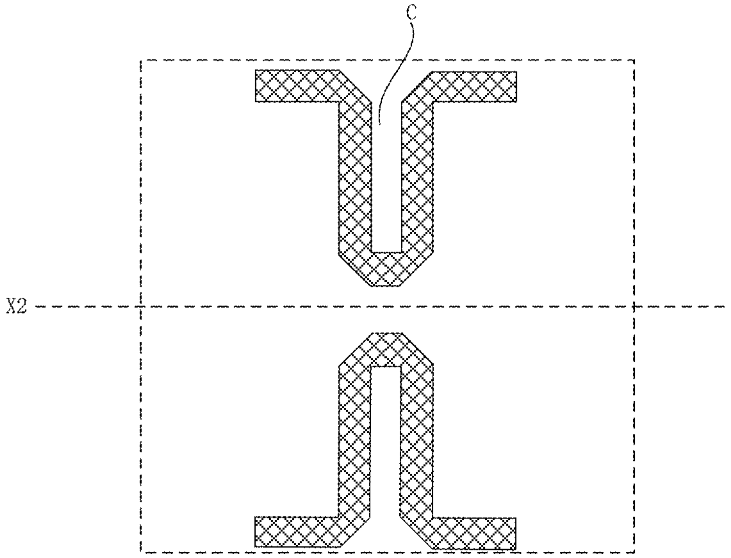
FIG. 3B is a plan view of an array unit according to an embodiment of the present disclosure.
Figure 3C:
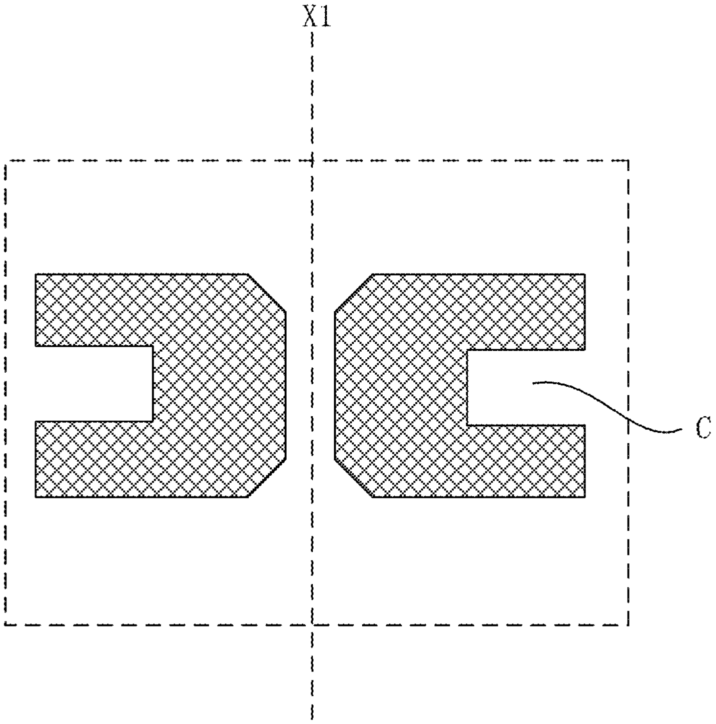
FIG. 3C is a plan view of an array unit according to an embodiment of the present disclosure.
Figure 3D:
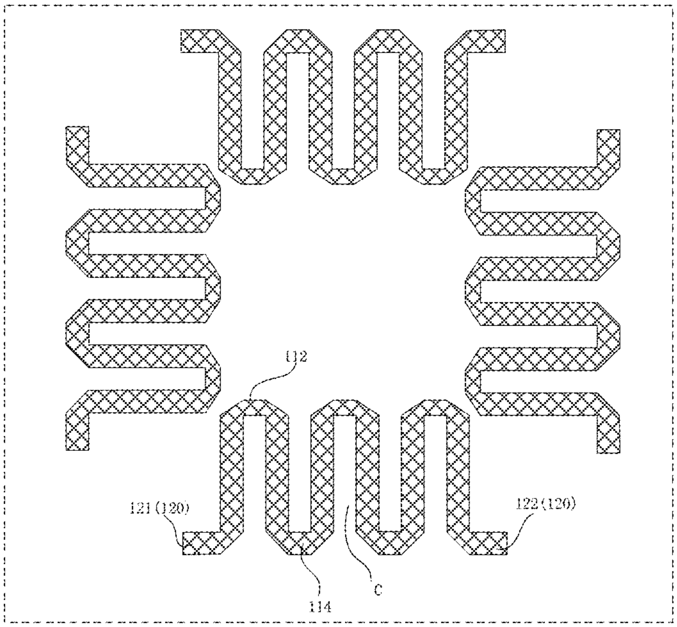
FIG. 3D is a plan view of an array unit according to an embodiment of the present disclosure.
Figure 3E:
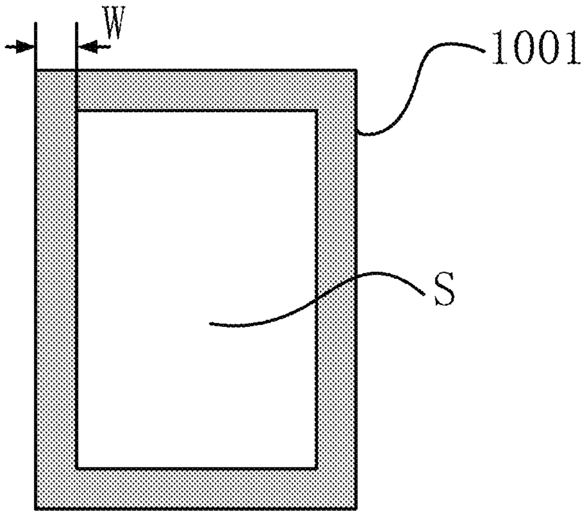
FIG. 3E is a plan view of a hollow hole (i.e., a hollowed-out hole) in an array unit according to an embodiment of the present disclosure.
Figure 3F:
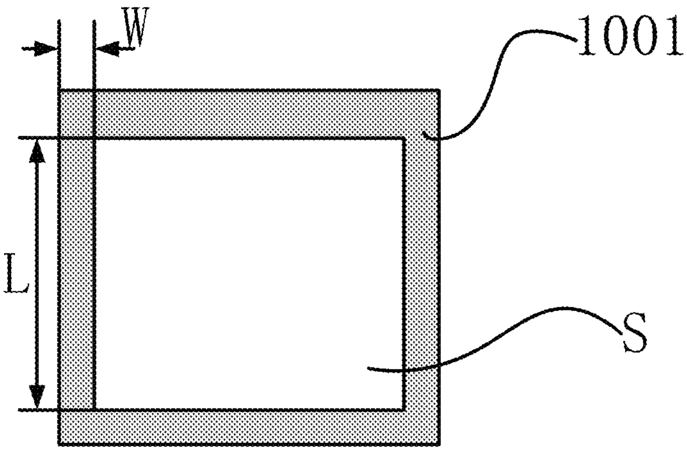
FIG. 3F is a plan view of a hollow hole in an array unit according to an embodiment of the present disclosure.

As shown in FIGS. 3E and 3F, in the filter structure provided by the present disclosure, the metal patch 100 includes a metal patch body 1001 and a plurality of hollow holes S formed in the metal patch body, so that the overall light transmittance of the filter structure can be further increased, and the concealment and aesthetics of the filter structure attached to a surface of another object can be further enhanced.

In some embodiments of the present disclosure, most of the metal patch body 1001 is removed to form the hollow holes S. That is, as shown in FIG. 3A, the metal patch body 1001 may be directly formed as a metal mesh structure. An opening (or aperture) of the metal mesh structure is a hollow hole S. In this case, the light transmittance of the filter structure including the metal patch 100 may reach 70% to 88%.

A method for forming the metal patch 100 with the hollow holes on the transparent plastic film 200 is not specifically limited in an embodiment of the present disclosure. For example, optionally, the metal patch 100 with the hollow holes S may be formed by etching holes in the metal patch body by an etching process, or the metal patch 100 with the hollow holes S may also be formed by imprinting a metal mesh on the transparent plastic film 200 by an imprint process.

A distance between any adjacent two of the hollow holes S (i.e., a width of a thread of the metal mesh) is not specifically limited in an embodiment of the present disclosure. For example, as an optional embodiment of the present disclosure, as shown in FIG. 3E, a cross-sectional shape of each of the hollow holes S is a rectangle (in other words, in a plan view, the shape of each of the hollow holes S is rectangular), and the distance W between any adjacent two of the hollow holes S may be 2 um to 30 um (i.e., the width of the thread of the metal mesh is 2 um to 30 um).

A size of each of the hollow holes S (i.e., a distance between any adjacent two of threads of the metal mesh) is not specifically limited in an embodiment of the present disclosure. For example, as an optional embodiment of the present disclosure, as shown in FIG. 3F, the cross-sectional shape of each of the hollow holes S is a square (in other words, in a plan view, the shape of each of the hollow holes S is square), and a length L of each side of each of the hollow holes S in the cross section may be in a range from 50 um to 200 um (that is, the distance between any adjacent two of the threads of the metal mesh is in a range from 50 um to 200 um).

A thickness of the metal patch 100 (i.e., a size of the metal patch 100 or the metal patch body 1001 in a direction perpendicular to the transparent plastic film 200) is not specifically limited in an embodiment of the present disclosure. For example, as an optional embodiment of the present disclosure, the thickness of the metal patch body 1001 in the direction perpendicular to the transparent plastic film 200 is in a range from 1 um to 10 um, such as 1 um, 2 um, 3 um, 4 um, 5 um, 6 um, 7 um, 8 um, 9 um, or 10 um.

A material of the metal patch 100 is not specifically limited in an embodiment of the present disclosure. For example, as an optional embodiment of the present disclosure, the material of the metal patch body 1001 includes copper, silver, aluminum, or magnesium.

Figure 5:
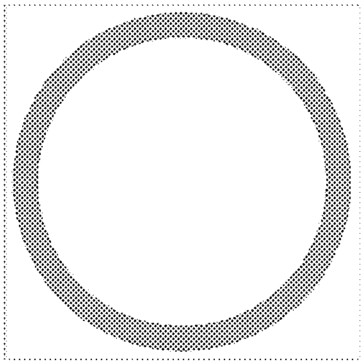
FIG. 5 is a plan view of an array unit according to an embodiment of the present disclosure.
Figure 6:
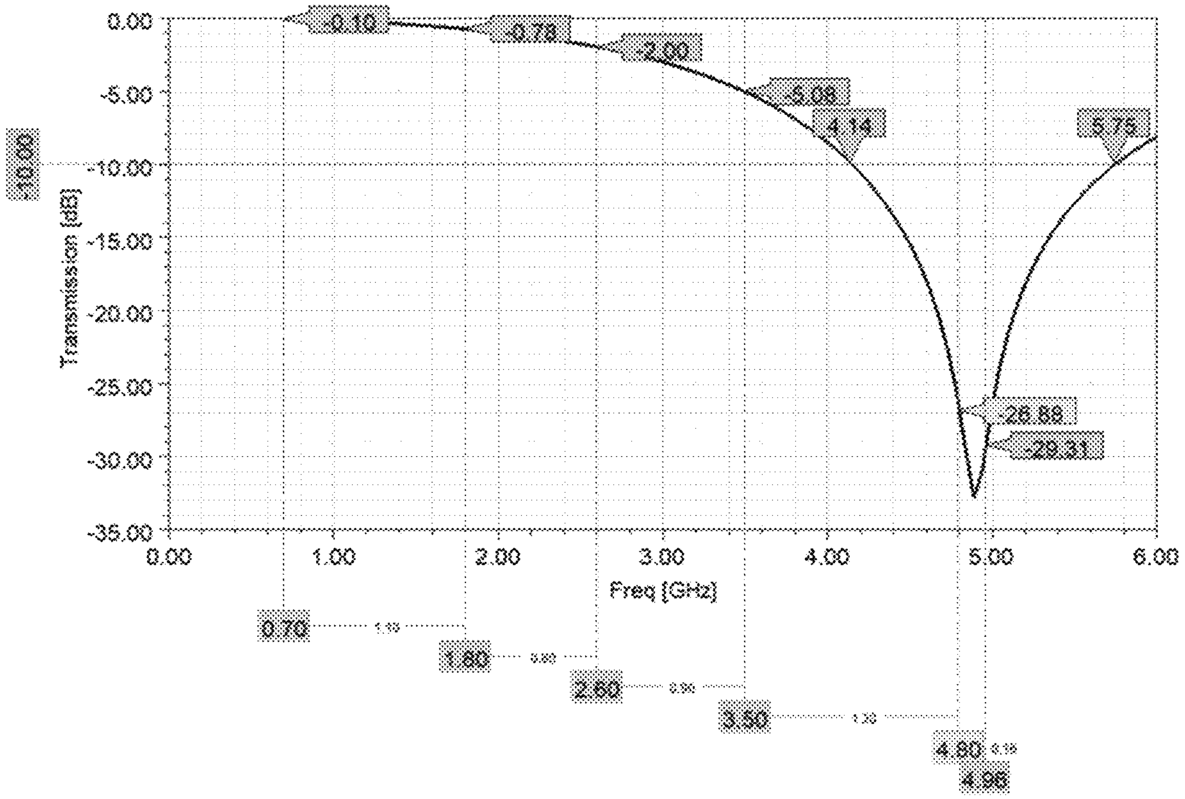
FIG. 6 is a schematic diagram illustrating insertion loss characteristics of a filter structure having an array unit shown in FIG. 5.

FIG. 5 is a plan view of an array unit according to an embodiment of the present disclosure, which shows that each array unit includes one ring metal patch which may also have hollow holes (not shown). FIG. 6 is a schematic diagram illustrating insertion loss characteristics of a filter structure having the array unit shown in FIG. 5, in which the horizontal axis represents the frequencies of electromagnetic wave signals, and the vertical axis represents the amounts of gain loss when the electromagnetic wave signals of respective frequencies pass through the filter structure.

As shown in FIG. 5, the metal resonant array formed by a plurality of array units each including one ring metal patch is formed on the transparent plastic film 200, so that the filter structure has a high light transmittance, is easily attached to a surface of transparent glass, transparent plastic or the like and itself is hidden from view, thereby enhancing the overall aesthetics of an apparatus and facilitating the lightness and thinness of the apparatus. Further, most of the metal patch body of the ring metal patch is removed to form hollow holes S, so that the overall light transmittance of the filter structure can be further increased, and the concealment and aesthetics of the filter structure attached to a surface of another object are further enhanced.

As can be seen from FIG. 6, the filter structure meets the requirement of shielding signals of 4.14 GHz to 5.75 GHz (i.e., a 1.61 GHz bandwidth) under the standard of loss of −10 dB, while the insertion loss at the frequency point of 3.5 GHz is only −5.08 dB (i.e., the insertion loss of electromagnetic wave signals outside the shielded frequency band is too large). Therefore, although the filter structure may easily block a target frequency band (of 4,800 MHz to 4,960 MHz, i.e., a 4.9 GHz band), the low loss in a common low frequency band (of 700 MHz to 3,500 MHz) cannot be realized.

Figure 7:
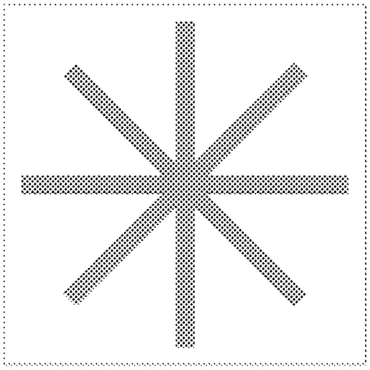
FIG. 7 is a plan view of an array unit according to an embodiment of the present disclosure.
Figure 8:
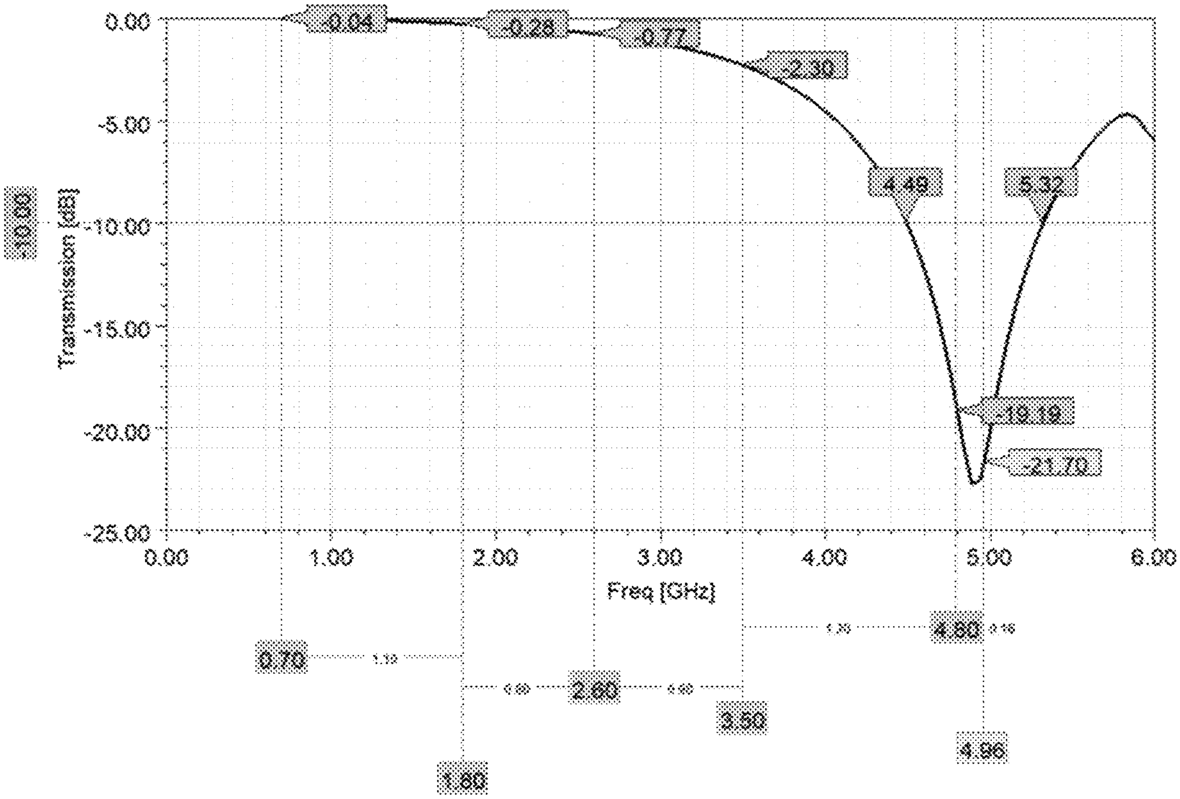
FIG. 8 is a schematic diagram illustrating insertion loss characteristics of a filter structure having an array unit shown in FIG. 7.

FIG. 7 is a plan view of an array unit according to an embodiment of the present disclosure, which shows that each array unit includes a metal patch of a shape of a “*” or “ ” of an asterisk, and the metal patch of the shape of the “*” may also have hollow holes (not shown). FIG. 8 is a schematic diagram illustrating insertion loss characteristics of a filter structure having the array unit shown in FIG. 7, in which the horizontal axis represents the frequencies of electromagnetic wave signals, and the vertical axis represents the amounts of gain loss when the electromagnetic wave signals of respective frequencies pass through the filter structure.

As shown in FIG. 7, the metal resonant array formed by a plurality of array units each including one metal patch of the shape of the “*” or of the asterisk is formed on the transparent plastic film 200, so that the filter structure has a high light transmittance, is easily attached to a surface of transparent glass, transparent plastic or the like and itself is hidden from view, thereby enhancing the overall aesthetics of an apparatus and facilitating the lightness and thinness of the apparatus. Further, most of the metal patch body of the metal patch of the shape of the “*” or of the asterisk is removed to form hollow holes S, so that the overall light transmittance of the filter structure can be further increased, and the concealment and aesthetics of the filter structure attached to a surface of another object are further enhanced.

As can be seen from FIG. 8, the filter structure meets the requirement of shielding signals of 4.49 GHz to 5.32 GHz (i.e., an 830 MHz bandwidth) under the standard of loss of −10 dB. However, although the selectivity of this filter structure is enhanced compared with the filter structure including the ring metal patch, it still cannot effectively reduce the insertion loss at the 3.5 GHz frequency point. As shown in FIG. 8, the insertion loss of the metal patch of the shape of the “*” or of the asterisk at the frequency point of 3.5 GHz is only −2.3 dB. Although the metal patch of the shape of the “*” or of the asterisk has a great improvement in insertion loss compared to the ring metal patch, the metal patch of the shape of the “*” or of the asterisk cannot reduce the insertion loss at 3.5 GHz to be less than 1 dB.

As can be seen from the technical solutions shown in FIGS. 5 to 8, although the corresponding single layer frequency selective surface can shield the target frequencies, it may also block the frequency bands other than the target frequencies, resulting in poor selectivity. To solve the above problem, the conventional method for improving the frequency selectivity generally includes cascading a plurality of single layer frequency selective surface structures to form a multi-layer frequency selective surface structure, but the multi-layer cascading increases the overall thickness of the resulting structure, which is not favorable for the lightness and thinness of an apparatus.

In order to solve the above technical problem and further improve the lightness and thinness and the aesthetics of an apparatus, optionally, as shown in FIG. 2 and FIG. 3B, each of the array units of the metal resonant array includes at least two metal patches 100 having a same shape, and the at least two metal patches 100 are provided axisymmetrically. Each of the at least two metal patches has at least one opening C. The openings C of the at least two metal patches are symmetrically provided with respect to a symmetry axis of the at least two metal patches. The openings C of the at least two metal patches are symmetrically provided about the symmetry axis of the at least two metal patches, so that the at least two metal patches may serve as metal resonant devices, and the currents generated in the at least two metal patches have opposite directions to offset each other, thereby improving the quality factor of the metal resonant devices and further improving the filtering performance of a selected frequency band.

Optionally, as shown in FIGS. 3B and 3C, each array unit includes two metal patches. a shape of each of the metal patches is not limited herein, as long as the openings of the metal patches are symmetrical about the symmetry axis of the at least two metal patches (i.e., the symmetry axis X2 in FIG. 3B or the symmetry axis X1 in FIG. 3C). As shown in FIG. 3B, each of the metal patches may have a shape of a U-shape or a Ω-shape, and the two metal patches are symmetrically provided about the symmetry axis X2. As shown in FIG. 3C, each of the metal patches may have a shape of a rectangle with a rectangular opening, and the two metal patches are symmetrically provided about the symmetry axis X1. However, the present disclosure is not limited thereto.

Optionally, each array unit may have a plurality of metal patches therein. As shown in FIGS. 3A and 3D, each array unit may have four metal patches. The number of metal patches in each array unit may be preset as desired, and the present disclosure is not limited thereto.

Optionally, in a specific example, as shown in FIG. 3A, the metal patch body of each metal patch 100 includes at least one bent portion 110, and the bent portion 110 includes two straight arms 111 and one first connection arm 112. A first straight arm 1111 and a second straight arm 1112 included in the two straight arms 111 in a same bent portion 110 extend in a same direction, and the ends of the two straight arms 111 proximal to a center of the array unit including the two straight arms 111 are connected to each other through the first connection arm 112. The two straight arms 111 and the first connection arm 112 form the opening C, which is similar to a U-shape or a Ω-shape.

Optionally, in a specific example, as shown in FIG. 3A, each array unit may further include two strip portions 120 (including a first strip portion 121 and a second strip portion 122). The two strip portions 120 extend along a same direction, the extending direction of the two strip portions 120 is different from the extending direction of the straight arms 111 of the metal patch body, and the bent portion 110 is located between the two strip portions 120 and the center of the array unit including the bent portion 110 and the two strip portions 120. For example, the extending direction of the two strip portions 120 of one metal patch 100 may be perpendicular to the extending direction of each of the straight arms 111 of the one metal patch 100.

As shown in FIG. 3A, the bent portion 110 is connected between two corresponding strip portions 120. That is, the first straight arm 1111 is connected to the first strip portion 121, the second straight arm 1112 is connected to the second strip portion 122, and the bent portion 110 is located between the first strip portion 121 and the second strip portion 122. The number of bent portions 110 connected between the two strip portions 120 is not specifically limited in an embodiment of the present disclosure. For example, optionally, as shown in FIG. 3A, each of the metal patches 100 may include one bent portion 110, and the ends of the two straight arms 111 of the bent portion 110 distal to the center of the corresponding array unit are connected to the corresponding two strip portions 120.

Optionally, as shown in FIG. 3D, a plurality of bent portions 110 may be connected between two strip portions 120, that is, each of the metal patches 100 includes the plurality of bent portions 110 arranged in sequence along the extending direction of the two strip portions 120. The ends, which are distal to the center of the corresponding array unit, of two adjacent straight arms 111 belonging to different bent portions 110 are connected to each other through a second connection arm 114. The extending directions of the plurality of straight arms 111 of the plurality of bent portions 110 are the same, and the ends, which are distal to the center of the array unit including the straight arms 111, of the straight arms 111 located at the outer edges (i.e., the two outermost straight arms 111 of the straight arms 111 arranged along the extending direction of the strip portions 120 or along the arrangement direction of the plurality of bent portions 110) are connected to the strip portions 120 at corresponding sides, respectively. In a specific example, as shown in FIG. 3D, each of the metal patches has three bent portions 110 connected in sequence, and the two outermost straight arms 111 of the three bent portions 110 are connected to the first strip 121 and the second strip 122, respectively.

A manner in which the two adjacent straight arms 111 belonging to different bent portions 110 are connected to each other is not specifically limited in an embodiment of the present disclosure. For example, the metal patch body may further include at least one connection portion (i.e., the second connection arm 114) between two adjacent bent portions 110. Two ends of the second connection arm 114 are respectively connected to the ends, which are distal to the center of the array unit including the corresponding straight arms, of the corresponding straight arms 111 of the bent portions 110 on two sides of the second connection arm 114, and the second connection arm 114 and the two strip portions 120 extend along a same direction.

The number of the metal patches 100 in each of the array unit is not specifically limited in an embodiment of the present disclosure. For example, as shown in FIG. 3A, optionally, each of the array units includes a plurality of metal patches 100, and the plurality of metal patches 100 are arranged axisymmetrically in pairs and arranged around the center of the array unit including the plurality of metal patches 100.

As an exemplary embodiment of the present disclosure, as shown in FIG. 3A, each of the array units may include four metal patches 100. A first two metal patches 101 and 102 of the four metal patches are provided axisymmetrically, and a second two metal patches 103 and 104 of the four metal patches are provided axisymmetrically. Further, the symmetry axis X1 of the first two metal patches is perpendicular to the symmetry axis X2 of the second two metal patches. For example, the center of each array unit may be the intersection of the symmetry axis X1 and the symmetry axis X2 of the array unit.

As an exemplary embodiment of the present disclosure, as shown in FIGS. 1 and 3A, a plurality of array units are arranged in an array along the row direction R1 and the column direction R2 on the transparent plastic film, the extending direction of the symmetry axis X1 of the first two metal patches is parallel to the column direction R2, and the extending direction of the symmetry axis X2 of the second two metal patches is parallel to the row direction R1. Further, as shown in FIG. 1, the metal patches in any adjacent two array units in the row direction and/or the column direction among the plurality of array units are provided axisymmetrically. Specifically, as shown in FIG. 1, the metal patches in two adjacent array units in the row direction and/or in the column direction are provided axisymmetrically along a center line, which is parallel to the column direction or the row direction, of a gap between the two adjacent array units. As a result, the metal patches in the plurality of array units are distributed regularly. For example, the plurality of array units are arranged along the row direction R1 and the column direction R2 on the transparent plastic film to form a single-layer structure. In other words, in the direction perpendicular to the transparent plastic film, the array formed by the plurality of array units has a structure of only one layer. In this case, the thickness of the filter structure can be effectively reduced.

The relationship among the extending direction of each straight arm 111, the extending direction of each first connection arm 112, the extending direction of each second connection arm 114 and the extending direction of each strip portion 120 is not specifically limited in an embodiment of the present disclosure. For example, optionally, the extending direction of each straight arm 111 and the extending direction of the corresponding first connection arm 112 are perpendicular to each other, the extending direction of each straight arm 111 and the extending direction of the corresponding strip portion 120 are perpendicular to each other, and the extending direction of each first connection arm 112 and the extending direction of each second connection arm 114 are the same or parallel to each other.

In order to increase the arrangement compactness of the plurality of metal patches 100 and the product yield, as shown in FIG. 3A, optionally, a chamfer (or chamfered edge) 113 is formed at the outside edge of the connection position of each straight arm 111 and the corresponding first connection arm 112 of each of the metal patches 100. Each chamfer 113 of each of the bent portions 110 is opposite to and spaced apart from a corresponding (e.g., adjacent) chamfer 113 of an adjacent bent portion 110 at the corresponding side. Similarly, as shown in FIG. 3D, the outside edge of the connection position between a straight arm 111 and the corresponding second connection arm 114 is also formed with a chamfer 113.

If the outside edges of the connection position(s) between a straight arm 111 and the corresponding first and/or second connection arms 112 and 114 have a right angle shape (i.e., are not chamfered), the straight arm and the corresponding first and/or second connection arms 112 and 114 intersect at the connection position(s) to form a right angle profile. In the embodiment of the present disclosure, the right angle profile is chamfered to obtain a chamfer 113, so that while a space between the bent portions 110 of different metal patches 100 is reduced (i.e., the space occupied by the right angle profile is saved), the right angle profiles of different metal patches 100 can be prevented from contacting with each other and being short-circuited, and the product yield is increased.

The angle of the chamfered edge 113 is not specifically limited in an embodiment of the present disclosure. For example, optionally, as shown in FIGS. 3A and 3D, each of the angle between a chamfered edge 113 and the extending direction of the corresponding straight arm 111 and the angle between a chamfered edge 113 and the extending direction of the corresponding first or second connection arm 112 or 114 is, for example, 45°.

Optionally, the inside edge of the connection position between a straight arm 111 and the corresponding strip portion 120 is also formed with a chamfer (or chamfered edge). The angle between the extending direction of the chamfered edge and the straight arm 111 or the corresponding strip portion 120, is, for example, 45°.

Figure 4:
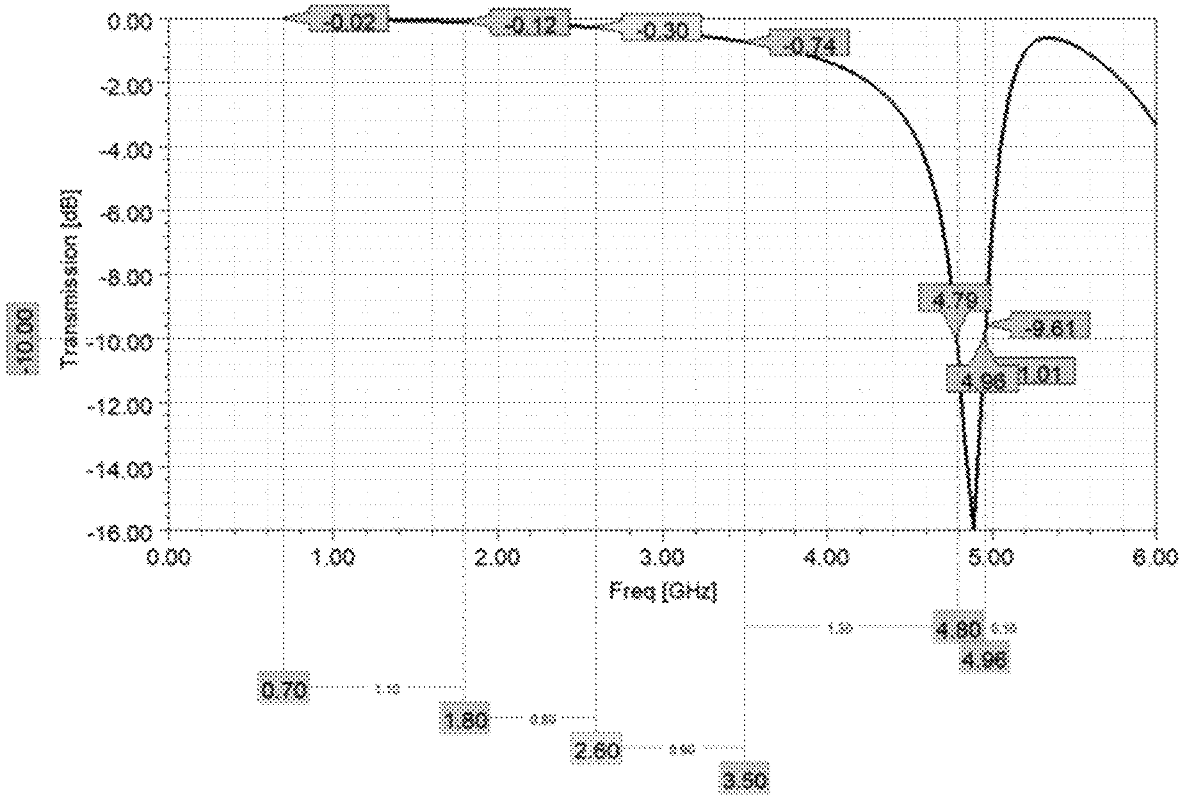
FIG. 4 is a schematic diagram illustrating insertion loss characteristics of a filter structure having an array unit shown in FIG. 3A.

FIG. 4 is a schematic diagram illustrating insertion loss characteristics of a filter structure having the array unit shown in FIG. 3A. As can be seen from FIG. 4, the filter structure meets the requirement of shielding signals of 4.79 GHz to 4.96 GHz (i.e., a 170 MHz bandwidth) under the standard of loss of −10 dB. The filter structure provided by the present embodiment has a high selectivity, and can effectively reduce the insertion loss at the frequency point of 3.5 GHz, so that the insertion loss is lower than 1 dB (i.e., the insertion loss is greater than −1 dB). At present, the insertion loss of −0.74 dB at the frequency point of 3.5 GHz can be achieved, thereby ensuring efficient transmission of common low frequency (i.e., 700 MHz to 3,500 MHz) signals.

The filter structure provided by the present disclosure is a transparent structure, can achieve highly selective shielding of the target frequency by including only a single layer film structure, thereby greatly reducing the resonance bandwidth. Further, the filter structure provided by the present disclosure can achieve an insertion loss of less than 1 dB in the 700 MHz to 3,500 MHz frequency band. Therefore, the multi-layer cascading solution in the related art may be replaced by the single layer filter structure provided by the present disclosure, which further enhances the lightness and thinness and the aesthetics of an apparatus.

It should be noted that, the frequency selectivity of the filter structure provided by the above embodiments of the present disclosure may be fine-tuned by adjusting the positions and the structures of the metal patches 100 in each array unit. For example, the fine tuning of the shielded frequency band of the filter structure may be realized by changing the number of the bent portions 110 in each of the metal patches 100, changing the widths of portions (e.g., each straight arm 111, each first connection arm 112, each second connection arm 114, and/or each strip portion 120) of the metal patch body, and changing the distance between the metal patches 100 (e.g., by changing the distance between the chamfered edges 113 of two adjacent metal patches 100), so that the frequency band shielded by the filter structure covers 4.9 GHz band or other target frequency bands.

Figure 9:
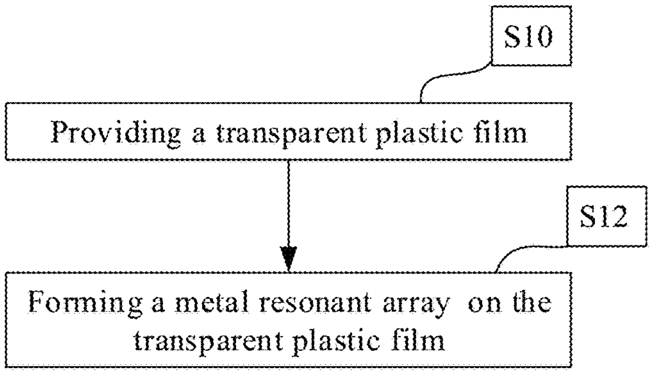
FIG. 9 is a flow chart of a method for manufacturing a filter structure according to an embodiment of the present disclosure.

According to an embodiment of the present disclosure, a method for manufacturing the above filter structure is further provided. As shown in FIG. 9, the method for manufacturing the filter structure includes steps S10 and S12.

In step S10, a transparent plastic film is provided. The transparent plastic film may be a polyimide film, a polyethylene terephthalate film, a cyclic olefin polymer film, or a polymethyl methacrylate film. The transparent plastic film may have a thickness in a range from 50 um to 250 um.

In step S12, a metal resonant array is formed on the transparent plastic film, such that the metal resonant array includes a plurality of array units.

Specifically, the metal resonant array may be formed on the transparent plastic film through an imprinting process or an etching process, such that each of the plurality of array units in the metal resonant array includes at least one metal patch, each of the at least one metal patch includes a metal patch body, and the metal patch body has therein a plurality of hollow holes.

In addition to the above steps S10 and S12, the method for manufacturing the filter structure may further include steps for forming any other components of each array unit of the filter structure provided by any one of the above embodiments of the present disclosure.

It should be understood that, the various embodiments of the present disclosure described above may be combined with each other in a case of no explicit conflict.

It will be understood that, the above embodiments are merely exemplary embodiments employed to illustrate the principles of the present disclosure, and the present disclosure is not limited thereto. It will be apparent to one of ordinary skill in the art that various changes and modifications can be made therein without departing from the spirit and scope of the present disclosure, and such changes and modifications are to be considered to fall within the scope of the present disclosure.

What is claimed is:

1. A filter structure, comprising a metal resonant array comprising a plurality of array units, wherein the filter structure further comprises a transparent plastic film, and the metal resonant array is on the transparent plastic film;

wherein each of the plurality of array units comprises at least one metal patch, each of the at least one metal patch comprises a metal patch body having therein a plurality of hollow holes; and wherein each of the plurality of hollow holes has a shape of a rectangle, and a distance between any adjacent two of the plurality of hollow holes is in a range from 2 um to 30 um.

2. The filter structure of claim 1, wherein the transparent plastic film has a thickness in a range from 50 um to 250 um.

3. The filter structure of claim 2, wherein a material of the transparent plastic film comprises any one of polyimide, polyethylene terephthalate, cyclic olefin polymer, and polymethyl methacrylate.

4. The filter structure of claim 1, wherein each of the plurality of hollow holes has a shape of a square, and a length of each side of the square is in a range from 50 um to 200 um.

5. The filter structure of claim 1, wherein the metal patch body has a thickness in a range from 1 um to 10 um in a direction perpendicular to the transparent plastic film.

6. The filter structure of claim 1, wherein a material of the metal patch body comprises any one of copper, silver, aluminum, and magnesium.

7. A filter structure, comprising a metal resonant array comprising a plurality of array units, wherein the filter structure further comprises a transparent plastic film, and the metal resonant array is on the transparent plastic film;

wherein each of the plurality of array units comprises at least one metal patch, each of the at least one metal patch comprises a metal patch body having therein a plurality of hollow holes; and wherein each of the plurality of array units comprises at least two metal patches, the at least two metal patches are provided axisymmetrically, each of the at least two metal patches comprises at least one opening, and openings of the at least two metal patches are provided symmetrically with respect to a symmetry axis of the at least two metal patches.

8. The filter structure of claim 7, wherein each metal patch body comprises at least one bent portion, each of the at least one bent portion comprises two straight arms and one first connection arm, the two straight arms in a same bent portion extend in a same direction, ends of the two straight arms proximal to a center of the array unit comprising the two straight arms are connected to each other through the first connection arm, and the two straight arms and the first connection arm form the opening.

9. The filter structure of claim 8, wherein each metal patch body further comprises two strip portions, the two strip portions extend along a same direction which is different from an extending direction of the two straight arms, and the two strip portions are respectively connected to ends, which are distal to the center of the array unit comprising the two straight arms, of the two straight arms at two ends of the metal patch body along an arrangement direction in which the at least one bent portion of the metal patch body is arranged.

10. The filter structure of claim 9, wherein each metal patch body comprises one bent portion, and the ends of the two straight arms of the one bent portion distal to the center of the array unit comprising the two straight arms are connected to two corresponding strip portions, respectively.

11. The filter structure of claim 10, wherein in the one bent portion of the metal patch body, the extending directions of the two straight arms are the same, an extending direction of the first connection arm is the same as an extending direction of the two strip portions, and the extending direction of the two straight arms and the extending direction of the first connection arm are perpendicular to each other.

12. The filter structure of claim 11, wherein each of the plurality of array units comprises four metal patches, a first two metal patches of the four metal patches are provided axisymmetrically, a second two metal patches of the four metal patches are provided axisymmetrically, and a symmetry axis of the first two metal patches is perpendicular to an symmetry axis of the second two metal patches.

13. The filter structure of claim 12, wherein the plurality of array units are arranged in an array on the transparent plastic film in a row direction and a column direction, an extending direction of the symmetry axis of the first two metal patches is parallel to the column direction, and an extending direction of the symmetry axis of the second two metal patches is parallel to the row direction.

14. The filter structure of claim 13, wherein metal patches in any adjacent two of the plurality of array units in the row direction are provided axisymmetrically, and/or metal patches in any adjacent two of the plurality of array units in the column direction are provided axisymmetrically.

15. The filter structure of claim 7, wherein the metal patch body has a thickness in a range from 1 um to 10 um in a direction perpendicular to the transparent plastic film.

16. The filter structure of claim 9, wherein each metal patch body comprises a plurality of bent portions arranged in sequence along an extending direction of the two strip portions, ends of two adjacent straight arms belonging to different bent portions distal to the center of the array unit comprising the two adjacent straight arms are connected to each other through a second connection arm, and ends, which are distal to the center of the array unit, of two of the straight arms of the plurality of bent portions at two sides along an arrangement direction of the plurality of bent portions of the metal patch body are connected to corresponding strip portions, respectively.

17. A method for manufacturing a filter structure, comprising:

providing a transparent plastic film; and forming a metal resonant array on the transparent plastic film, wherein the metal resonant array comprises a plurality of array units;

wherein the metal resonant array if formed on the transparent plastic film by an implanting process or an etching process, wherein each of the plurality of array units of the metal resonant array comprises at least one metal patch, and each of the at least one metal patch comprises a metal patch body having therein a plurality of hollow holes.

18. The method of claim 17, wherein the transparent plastic film is formed to have a thickness in a range from 50 um to 250 um, and the transparent plastic film is made of a material being any one of polyimide, polyethylene terephthalate, cyclic olefin polymer, and polymethyl methacrylate.

* * * * *